(No Model.)

A. W. THOMAS.
WHEEL TIRE.

No. 399,358. Patented Mar. 12, 1889.

WITNESSES:
O. B. Shepherd.
Hermann Bormann.

INVENTOR.
Amos W. Thomas,
By J. Walter Douglass.
Atty.

UNITED STATES PATENT OFFICE.

AMOS W. THOMAS, OF PHILADELPHIA, PENNSYLVANIA.

WHEEL-TIRE.

SPECIFICATION forming part of Letters Patent No. 399,358, dated March 12, 1889.

Application filed June 30, 1888. Serial No. 278,643. (No model.)

*To all whom it may concern:*

Be it known that I, AMOS W. THOMAS, a citizen of the United States, residing at the city of Philadelphia, in the county of Philadelphia and State of Pennsylvania, have invented certain new and useful Improvements in Inflatable Tires and Fasteners Therefor, of which the following is a specification.

This invention has for its object to provide simple means for securing inflatable or elastic tires to the fellies of wheels, and such tires as are in general applicable to the road-wheels of carriages or other rolling conveyances, but, however, more particularly to the road-wheels of bicycles, tricycles, and velocipedes of all varieties.

My invention consists of an inflatable flexible or elastic tire, of tubular or other form, mounted on or in the felly of the wheel and held to place thereon or therein by a band or bands of elastic or pliable material secured to the felly or hollow tire, or both, by cement or by being vulcanized to the hollow tire and clamped to or otherwise caused to circumscribe the surface of the felly of the wheel.

In the accompanying drawings, forming part of this specification, the characteristic features of my invention are embodied, and in which—

Figure 1:
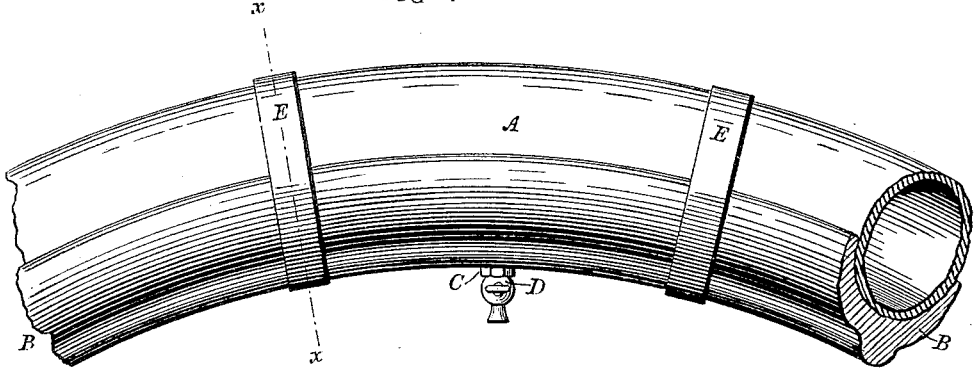
Figure 2:
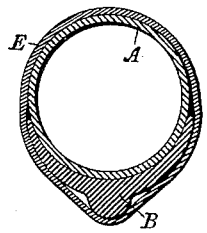
Figure 3:
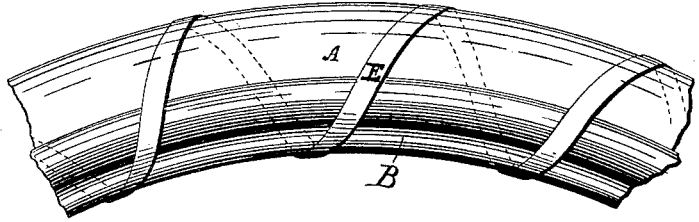

Figure 1 is a side elevation of a segmental portion of a felly and a hollow flexible tire mounted therein and held to place by means of separate elastic or pliable bands circumscribing both tire and felly. Fig. 2 is a transverse sectional view through a hollow tire and felly on the line *x x* of Fig. 1, with the band circumscribing both tire and felly; and Fig. 3 is a side elevation of a segment of a felly and a hollow flexible tire mounted therein and held to place by means of a single spirally-wrapped band cemented or otherwise secured to both tire and felly.

Referring to the drawings, A is the tire made of a continuous or endless tube of rubber or other suitable material.

B is the felly provided with a concave groove in the face thereof for the reception of the hollow tire A.

C is a tube provided with a cock-stop, D, and which tube is passed through the felly B into the interior of the tire A, and through which a liquid or fluid is introduced for the inflation of the fluid-tight tire.

E is the circumscribing band for firmly holding the hollow tire to place on the felly, or in the grooved face of the felly B. These bands may be made of either rubber, leather, or other tough, elastic, or pliable material; but I prefer to make them of the same material as that of which the hollow tire is mainly composed, in order that they may expand uniformly with the tube or tire in its inflation. The meeting ends of the bands may be secured together by cementation, or by riveting or stitching them together, or in any other preferred manner.

If desired, instead of merely springing the tire into the groove of the felly it may be cemented therein and the circumscribing bands cemented or otherwise secured to the outer circumference or surface of the tire and passed spirally around the felly, as shown in Fig. 3, with the ends thereof cemented, clamped, riveted, or otherwise secured to the felly B or to the tire A or both, whereby the tire will be held solidly in position for giving the best results in practice.

Having thus described the nature and objects of my invention, what I claim as new, and desire to secure by Letters Patent, is—

1. An inflatable tire sprung onto or into the felly and held by a band or bands of pliable material cemented or vulcanized to said tire or felly, or both, substantially as shown and described.

2. An inflatable tire sprung into a grooved felly and held therein by means of a pliable or elastic band or bands cemented or vulcanized to the tire and caused to circumscribe the surface of said felly, substantially as shown and described.

In witness whereof I have hereunto set my signature in the presence of two subscribing witnesses.

AMOS W. THOMAS.

Witnesses:
W. A. WHITMORE,
GEO. W. REED.